US008571969B1

(12) United States Patent
Groz

(10) Patent No.: US 8,571,969 B1
(45) Date of Patent: Oct. 29, 2013

(54) SYSTEM, METHOD AND PROGRAM PRODUCT FOR CONTINGENT COMMITMENTS

(76) Inventor: Marc Michael Groz, Stamford, CT (US)

(*) Notice: Subject to any disclaimer, the term of this patent is extended or adjusted under 35 U.S.C. 154(b) by 0 days.

(21) Appl. No.: 13/555,751

(22) Filed: Jul. 23, 2012

Related U.S. Application Data

(63) Continuation of application No. 12/244,022, filed on Oct. 2, 2008, now abandoned, which is a continuation-in-part of application No. 10/001,475, filed on Nov. 1, 2001, now abandoned.

(60) Provisional application No. 61/593,935, filed on Feb. 2, 2012, provisional application No. 61/575,063, filed on Aug. 15, 2011, provisional application No. 61/575,502, filed on Aug. 22, 2011, provisional application No. 61/575,522, filed on Aug. 23, 2011.

(51) Int. Cl.
*G06Q 40/00* (2012.01)
*G06Q 40/04* (2012.01)

(52) U.S. Cl.
CPC ............... *G06Q 40/00* (2013.01); *G06Q 40/04* (2013.01)
USPC .......................................................... 705/37

(58) Field of Classification Search
CPC ............................... G06Q 40/00; G06Q 40/04
USPC ...................................................... 705/37, 35
See application file for complete search history.

(56) References Cited

U.S. PATENT DOCUMENTS

| | | | |
|---|---|---|---|
| 5,136,501 A | 8/1992 | Silverman et al. | |
| 5,495,412 A | 2/1996 | Thiessen | |
| 5,924,082 A | 7/1999 | Silverman et al. | |
| 6,035,288 A | 3/2000 | Solomon | |
| 6,044,368 A * | 3/2000 | Powers ................................. | 1/1 |
| 6,131,087 A | 10/2000 | Luke et al. | |
| 6,141,653 A | 10/2000 | Conklin et al. | |
| 6,167,392 A | 12/2000 | Ostrovsky et al. | |
| 6,330,551 B1 | 12/2001 | Burchetta et al. | |
| 6,338,050 B1 | 1/2002 | Conklin et al. | |
| 6,691,094 B1 * | 2/2004 | Herschkorn .................... | 705/37 |
| 6,766,307 B1 | 7/2004 | Israel et al. | |
| 7,006,999 B1 | 2/2006 | Huberman et al. | |

(Continued)

FOREIGN PATENT DOCUMENTS

EP 698331 2/1996
JP 2002175438 6/2002

OTHER PUBLICATIONS

Beville, Matthew L., Financial Pollution: Systemic Risk and Market Stability (Sep. 9, 2008). Florida State University Law Review, vol. 36, p. 245, 2009. Abstract—available at SSRN: http://ssrn.com/abstract=1265886.

(Continued)

*Primary Examiner* — Ella Colbert
*Assistant Examiner* — Scott S Trotter
(74) *Attorney, Agent, or Firm* — Amster, Rothstein & Ebenstein, LLP

(57) ABSTRACT

A computer implemented method and system is disclosed for receiving contingent commitment facility information associated with establishing a contingent commitment facility includes CCF criteria for participation in the contingent commitment facility. The method and system may include determining one or more potential participants in the contingent commitment facility who meet CCF criteria associated with the contingent commitment facility and may send to devices associated with the one or more potential participants, invitations to participate in the contingent commitment facility. Contingent commitment information associated with a potential participant and the contingent commitment facility may be received and status of contingencies in the contingent commitment facility may be determined.

16 Claims, 6 Drawing Sheets

(56) References Cited

U.S. PATENT DOCUMENTS

| | | |
|---|---|---|
| 7,254,586 B2 | 8/2007 | Chen et al. |
| 7,333,950 B2 | 2/2008 | Shidler et al. |
| 7,343,341 B2 | 3/2008 | Sandor et al. |
| 7,493,279 B1 * | 2/2009 | Kwan ............... 705/37 |
| 7,533,054 B2 | 5/2009 | Hausman et al. |
| 7,685,048 B1 * | 3/2010 | Hausman et al. ............ 705/37 |
| 2002/0007362 A1 | 1/2002 | Collins et al. |
| 2002/0140726 A1 | 10/2002 | Schwartz et al. |
| 2004/0267660 A1 | 12/2004 | Greenwood et al. |
| 2006/0282355 A1 | 12/2006 | Canezin et al. |

OTHER PUBLICATIONS

Beville, Matthew L., Financial Pollution: Systemic Risk and Market Stability (Sep. 9, 2008). Florida State University Law Review, vol. 36, p. 245, 2009.

"NAM Launches clickNsettle.conn, A Unique Online Alternative Dispute Resolution Service." PR Newswire, Jun. 23, 1999.

"eSASA.com Signs Agreement With Square Trade to Provide Online Dispute Resolution; Square Trade Seal Reflects eSAS's Commitment to Serving Global Customers Reliably and Fairly." Business Wire, Aug. 29, 2000.

Roger Nushaum, "Evolution of Indexing", TheStreet.com, Dec. 8, 2006, copyright 1996-2008 TheStreet.com, Inc.

Michael Abramowitz and R.H. Melton, How Penthouse Loan, with 'Fantastic' Yield, went away, Jan. 4, 1988, The Washington Post, p. a7.

Scott W. Dorsey, "Borrow or Lease?", Feb. 2000, Plane and Pilot, p. 48.

Eve Mitchell, "Tighter lending standards make home loans hard to get", Jul. 20, 2007, Oakland Tribune, p. 1.

* cited by examiner

SYSTEM, METHOD AND PROGRAM PRODUCT FOR CONTINGENT COMMITMENTS

CROSS-REFERENCE TO RELATED APPLICATIONS

This application claims priority to U.S. Provisional Patent Application Ser. No. 61/593,935, filed Feb. 2, 2012, No. 61/575,063, filed Aug. 15, 2011, No. 61/575,502, filed Aug. 22, 2011 and No. 61/575,522, filed Aug. 23, 2011. The contents of each of which are incorporated herein by reference in their entirety.

This application further claims priority to U.S. patent application Ser. No. 12/244,022, filed on Oct. 2, 2008, which is continuation-in-part to U.S. patent application Ser. No. 10/001,475, filed on Nov. 1, 2001. The contents of each of which are incorporated herein by reference in their entirety as if set forth herein.

FIELD

The disclosure generally relates to system, methods and/or program product for contingent commitments.

BRIEF DESCRIPTION OF THE DRAWINGS

The features and advantages of the present disclosure will be more fully understood with reference to the following, detailed description when taken in conjunction with the accompanying figures, wherein:

FIGS. 1, 1A, 1B and 1C are schematic diagrams of potential participant systems in accordance with exemplary embodiments of the disclosure;

Figure 1:
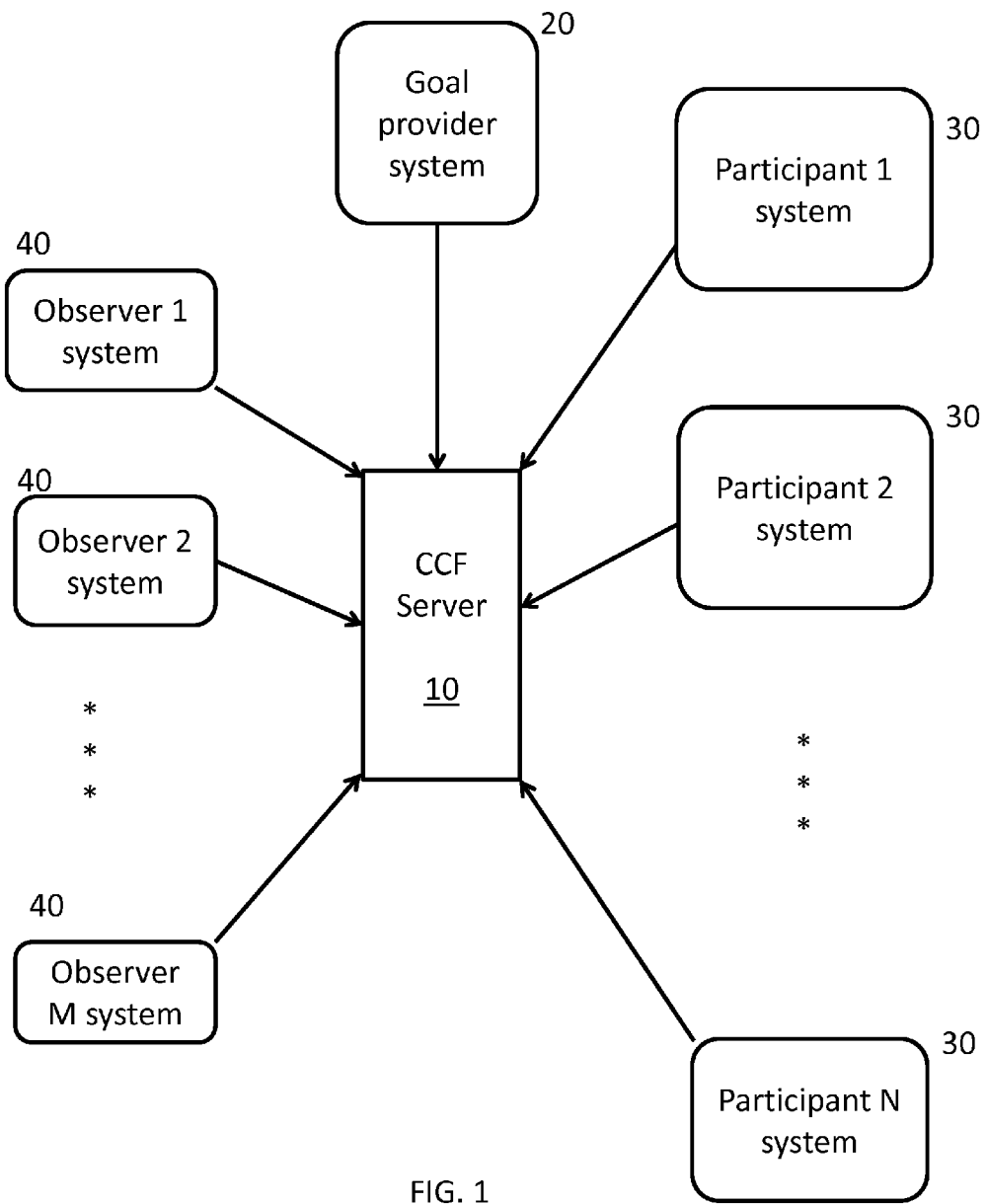
Figure 1:
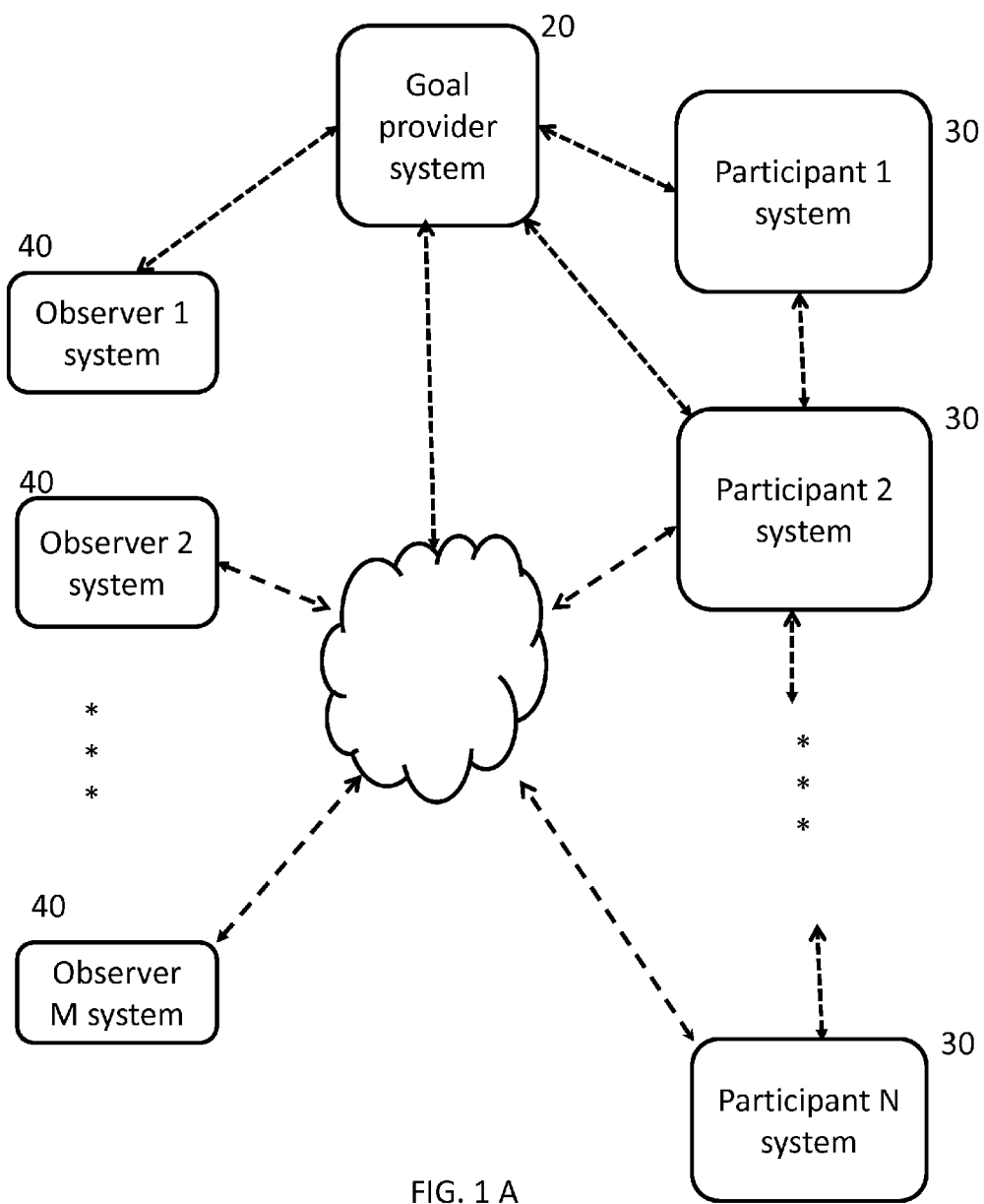
Figure 1:
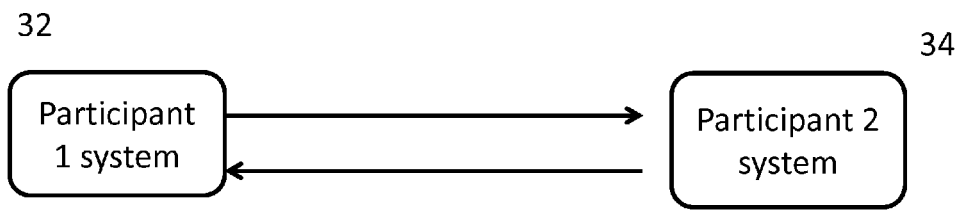
Figure 1:
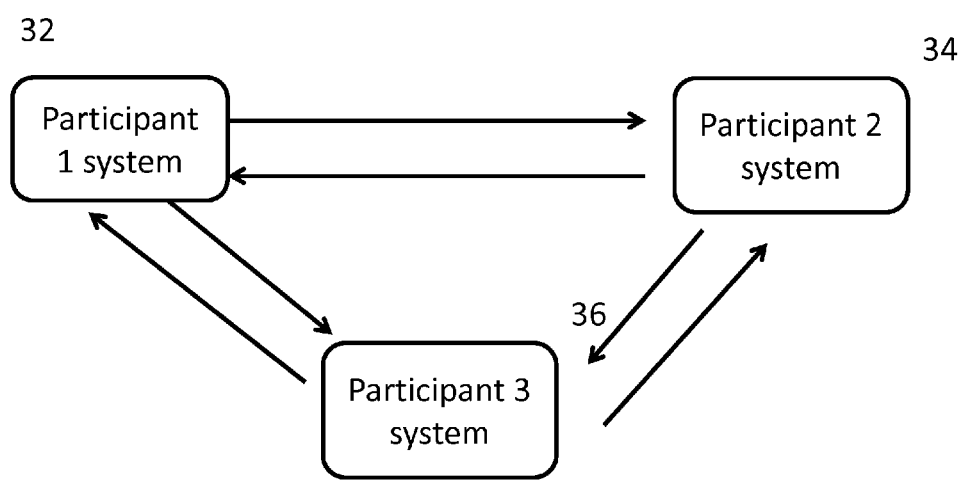

The headings used herein are for organizational purposes only and are not meant to be used to limit the scope of the description. As used throughout this application, the words "may" and "can" are used in a permissive sense (i.e., meaning having the potential to), rather than the mandatory sense (i.e., meaning must). Similarly, the words "include," "including," and "includes" can mean including but not limited to. To facilitate understanding, like reference numerals have been used, where possible, to designate like elements common to the figures.

SUMMARY

The disclosure generally relates to system, methods and/or program product for contingent commitments.

In exemplary embodiments, a computer implemented system and method is disclosed comprising: (a) accessing, using one or more computers, one or more electronic databases, stored on one or more computers-readable media in the performance of one or more of the following steps, the one or more databases comprising: (i) participant information comprising identifying information of respective participants and contact information of respective participants; (ii) contingent commitment facility information comprising problem information, identification of participants information, and one or more rules for processing commitments associated with said facility; (iii) contingent commitment information comprising contingency information; (iv) condition information comprising status information on events associated with respective contingent commitments; (b) receiving, by the one or more computers from a first user device, contingent commitment facility information associated with establishing a contingent commitment facility comprising CCF criteria for participation in the contingent commitment facility; (c) storing in the one or more databases the contingent commitment facility information; (d) determining, by the one or more computers, one or more potential participants in the contingent commitment facility who meet CCF criteria associated with the contingent commitment facility; (e) sending, by the one or more computers to devices associated with the one or more potential participants, invitations to participate in the contingent commitment facility; (f) receiving, at the one or more computers from at least one device associated with at least one of the one or more potential participants, first contingent commitment information associated with the at least one potential participant and the contingent commitment facility; (g) storing in the one or more databases the first contingent commitment information; (h) determining, using the one or more computer systems, a first status of contingencies in the contingent commitment facility; and (i) sending, using the one or more computers systems to at least the first user device, the first status.

In exemplary embodiments, the database can further comprise filter information associated with a respective participant, and information regarding the respective participant is made available to other participants in accordance with said filter information.

In exemplary embodiments, the database can further comprise filter information associated with a respective contingent commitment information, and information regarding the respective contingent commitment information is made available to participants in accordance with said filter information.

In exemplary embodiments, the database further comprises filter information associated with a respective contingent commitment facility information, and information regarding the respective contingent commitment facility information is made available to participants in accordance with said filter information.

In at least one exemplary embodiment, the computer implemented system and method may also include the step of generating, at the one or more computers, second contingent commitment information based on the first contingent commitment information, wherein the second contingent commitment information comprises a binding commitment contingent upon the existence of a third contingent commitment information which is related to the first contingent commitment information.

In exemplary embodiments, the first status comprises a first contingent commitment is a contingent commitment and the second status comprises the first contingent commitment becomes a conditionally binding commitment.

In exemplary embodiments, the first status comprises a first contingent commitment is a contingent commitment and the second status comprises the first contingent commitment becomes an absolutely binding commitment.

In exemplary embodiments, the first status comprises a first contingent commitment is a conditionally binding commitment and the second status comprises the first contingent commitment becomes an absolutely binding commitment.

DETAILED DESCRIPTION

The disclosure generally relates to system, methods and/or program product for contingent commitments.

In embodiments, a contingent commitment facility can be established by a goal provider providing parameters to the system associated with the contingent commitment facility. In embodiments, parameters can comprise data such as the goal of the facility, the desired participants to be included and/or excluded from participating in the facility, the desired observers to be allowed and/or excluded from accessing information related to the facility, the terms and conditions governing the facility, to name a few.

As used herein, the term "contingent commitment facility" means a system for processing, transmitting and/or receiving commitments which are contingent upon one or more conditions being satisfied, such as the occurrence of one or more events and/or transactions. In embodiments the commitments may be made by a user and/or generated by a computer pursuant to an algorithm.

In embodiments, a contingent commitment facility may include a commitment contingency which may depend upon one or more other contingent commitment facilities, which in turn include a commitment contingency which may depend upon one or more other contingent commitment facilities.

Further, in embodiments, a plurality of contingent commitment facilities may communicate with each other to solve problems incorporating a plurality of levels of contingency.

In embodiments, a contingent commitment facility can be established by a goal provider providing parameters to the system associated with the contingent commitment facility. In embodiments, parameters can comprise data such as the goal of the facility, the desired participants to be included and/or excluded from participating in the facility, the desired observers to be allowed and/or excluded from accessing information related to the facility, the terms and conditions governing the facility, to name a few.

In embodiments, the method and system can address problems of managing commitments. A contingent commitment facility may enable users to formulate and submit sets of contingent commitments and tests those sets for logical consistency and syntactical correctness. Validated sets of different users may be combined to discover outcomes that satisfy pre-defined objectives and constraints, while offering user-specifiable privacy protection before, during, and after the conclusion of group interaction.

FIGS. 1 and 1A are schematic diagrams of potential participant systems in accordance with exemplary embodiments of the disclosure.

A CCF server 10 is provided which comprises one or more computer systems operatively connected to process the contingent commitment information.

In embodiments, one or more goal providers systems 20 can access CCF server 10 to establish one or more contingent commitment facilities. For purposes of the present discussion to illustrate exemplary embodiments of the disclosure, one contingent commitment facility will be discussed. However, it is consistent with the scope of the disclosure that more than one contingent commitment facility can be processed at the same time and/or different times, based on parameters provided by one or more goal provider systems 20 associated with one or more goal providers. In some embodiments, a plurality of contingent commitment facilities may be processed either in series and/or in parallel.

In embodiments, one or more participant systems 30 can be provided access to CCF server 10 to participate in one or more contingent commitment facilities. Each participant system 30 may be associated with one or more participants. Each participant may utilize one or more participant systems to access CCF server 10. In embodiments, a participant may be invited by CCF server 10 to join as a participant. Potential participants to be invited by CCF server 10 may be identified either by users and/or the system by accessing appropriate databases, other web sites, such as social networks, or other data sources. In embodiments, invitations may be based on information provided by one or more goal provider systems, and/or by matching desired participant information with other information available to CCF server 10.

In embodiments, one or more observers 40 can be provided access to CCF server 10 to observe the development of one or more contingent commitment facilities. In embodiments access to one or more contingent commitment facilities may be limited based on various parameters. For example, in embodiments, the goal provider may limit access to a contingent commitment facility. In embodiments, participants may limit access to a contingent commitment facility, at least to the extent the participant participates in the facility.

In embodiments the same entity may participate in more than one role. For example, in embodiments a goal provider may also be a participant in the same facility. In embodiments, a goal provider in a first facility may be a participant and/or observer in a different facility. In embodiments, a participant in one facility may be an observer in a different facility. In embodiments, an observer in a facility may become a participant in that facility. In embodiments, a participant in a facility may elect to stop participating in that facility and become an observer and/or drop out of the process and/or later rejoin the process in the same or a different facility.

As illustrated in FIG. 1B, in embodiments, a central server may not be necessary, and alternatively the communications between participants may be performed directly. In such embodiments, using a bilateral system as a process, participant system 1 32 may communicate directly with participant system 2 34 to exchange contingent commitments. In exemplary embodiments of such a system, participant system 1 and participant system 2 may perform either alone or in conjunction with each other the full set of calculations necessary to determine if the contingencies have been satisfied for their respective contingent commitment facility.

While FIG. 1B shows two participant systems in communication, in other exemplary embodiments more than two systems can be in communication. For example, FIG. 1C illustrates a three system embodiment. Other configurations, including any number of participant systems, e.g., 4, 5, 100, 1000, 1,000,000, etc., are possible and consistent within the spirit and scope of the present disclosure.

When more than one system is performing the calculations, the necessary computer processing power may be distributed and divided among the participating systems. In embodiments where computer processing is shared, each system may consider only a subset of potential available contingencies to analyze the actual and possible solutions to one or more contingent commitment facilities.

Figure 2:
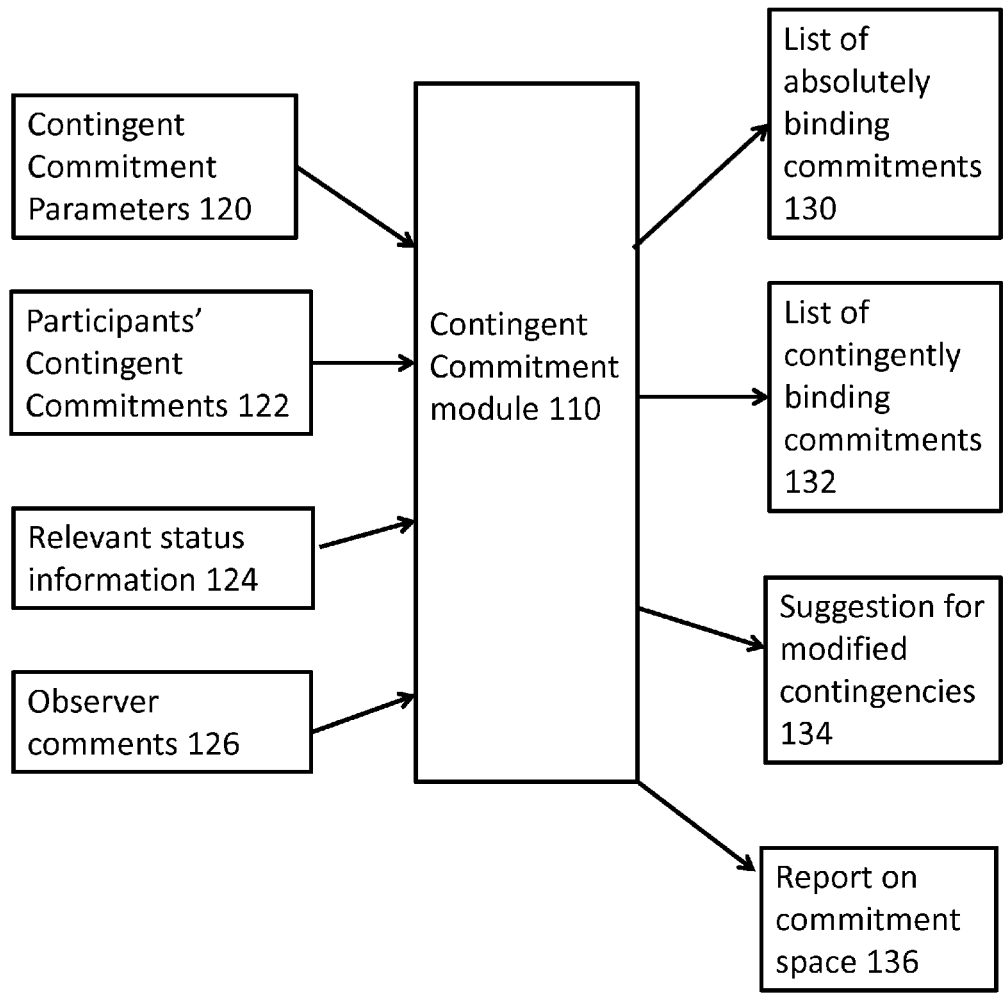
FIG. 2 is an exemplary data flow diagram illustrating a contingent commitment module 110 in accordance with exemplary embodiments of the disclosure.
Figure 3:
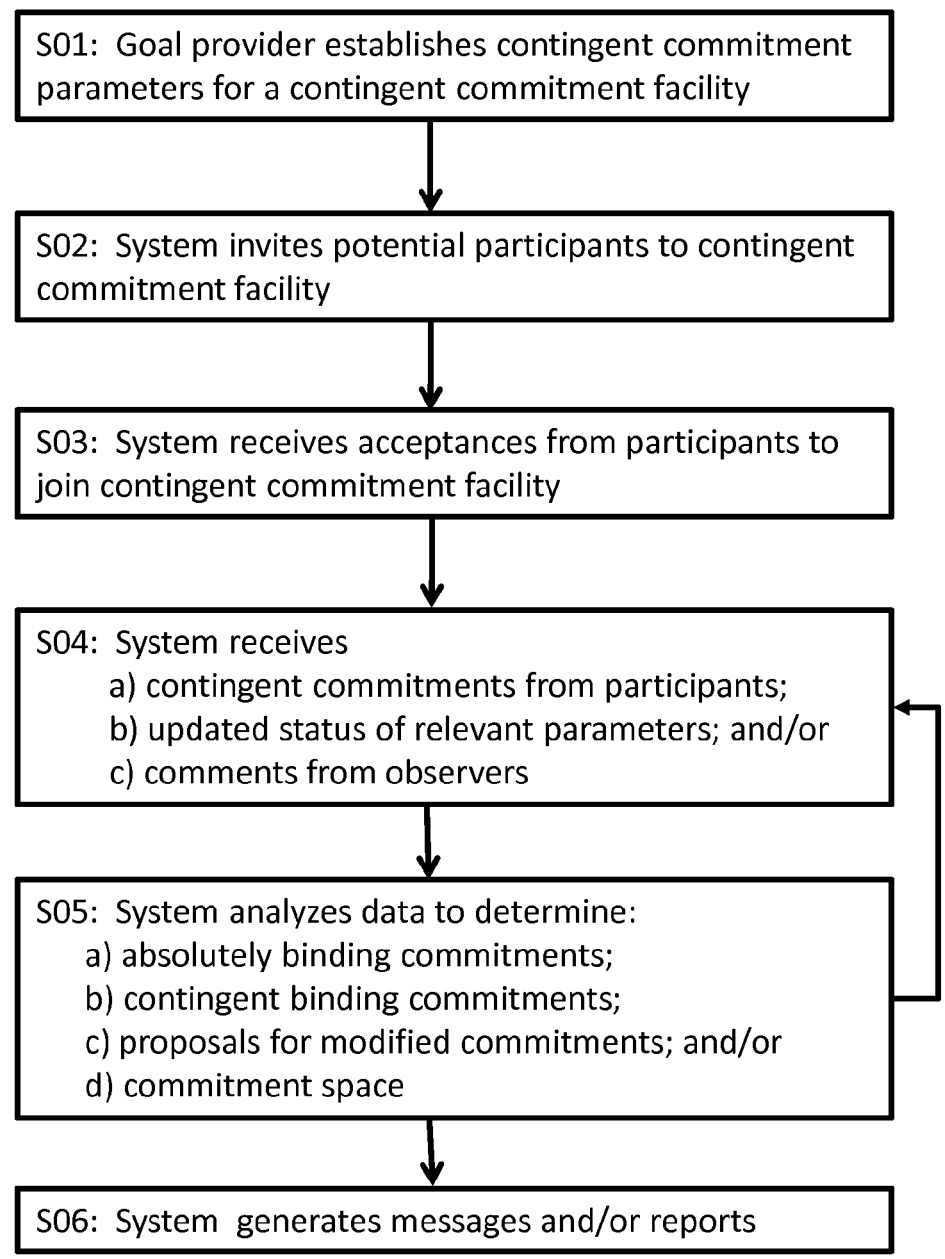
FIG. 3 is an exemplary flow chart illustrating a process in accordance with exemplary embodiments of the disclosure.

Exemplary embodiments of the process of the disclosure will now be discussed with reference to FIGS. 2 and 3. FIG. 2 is an exemplary data flow diagram illustrating a contingent commitment module 110 in accordance with exemplary embodiments of the disclosure. FIG. 3 is an exemplary flow chart illustrating a process in accordance with exemplary embodiments of the disclosure.

In embodiments, in step S01, a contingent commitment facility can be established by a goal provider providing parameters to the system associated with the contingent commitment facility. In embodiments, parameters can comprise data such as the goal of the facility, the desired participants to be included and/or excluded from participating in the facility, the desired observers to be allowed and/or excluded from accessing information related to the facility, the terms and conditions governing the facility, to name a few.

In embodiments, in step S02, system invites potential participants to join or participate in a contingent commitment facility. In embodiments, participants may be invited based on information provided by the goal provider. For example, the goal provider could identify by name a list of desired participants. In embodiments, the goal provider could identify by characteristic the desired participants. For example, the goal provider could identify it wants organizations with over 100 employees in a specific geographic regions to participant in the contingent commitment facility. The system can then match the parameters set by the goal participant to identify potential participants to invite to participate in the facility. The potential participants could be already registered to participate generally in the system, or new entities not already participating in the system. The system may access information on past participants and/or observers and/or goal providers in the databases of the system to determine potentially acceptable participants.

In embodiments, the goal provider and/or system could identify potentially excluded participants. For example, if a goal is develop a waterfront in a municipality to be a mixed use high end residential and commercial property. The goal provider could exclude waste companies from being potential participants in this contingent commitment facility. However, if another facility being created by the system involves cleaning up a contaminated property in a remote area, the waste companies may be identified a potential participant and/or observer for this second facility.

In embodiments, in step S03, the system receives acceptances from participants to join contingent commitment facility.

In embodiments, in step S04, the system can receive one or more of the following information which is stored in one or more databases in memory operatively connected to CCF server 10, including a) contingent commitments from participants 122; b) updated status of relevant parameters 124; and/or c) comments from observers 126.

As shown in FIG. 2, a contingent commitment module 110 can use as input these different types of data in conjunction with contingent commitment parameters 120 received from the goal provider system 10. In embodiments, in step S05, the system analyzes this data to determine a) absolutely binding commitments 130; b) contingent binding commitments 132; c) proposals for modified commitments 134; and/or d) commitment space 136.

An absolutely binding commitment is a commitment which has any and all of its contingencies fulfilled so that the pledgee is committed to perform the obligation.

A contingent binding commitment is a commitment in which the pledgee will be obligated to perform once one or more as yet unfulfilled contingencies have occurred. In the case where a contingent binding commitment may contain multiple contingencies, it will remain a contingent binding commitment unless and until all the necessary contingencies have been fulfilled. In the case where a contingent binding commitment may be based on alternative contingencies, it will remain a contingent binding commitment until a sufficient set of contingencies have been fulfilled to make the commitment binding, in which case it will become an absolutely binding commitment, even though some of the alternatives contingencies now unnecessary have not been fulfilled. For example if a contingent binding commitment is contingent upon either a purchase of a property or a lease of the same property, it will become an absolutely binding commitment if the property is purchased, even if it is not leased.

A proposal for modified contingencies can take any form sufficient to convey electronically the proposed modification of the contingent obligation. For example, if there is a binding contingent commitment to fund the paving of a street if a property is sold for at least $100,000, a proposal to modify the absolutely binding commitment could be to pave ½ the street if a the property is sold for at least $50,000. This example is intended to be illustrative, and not in any way limiting of the scope that proposed modification can take.

Proposed modified contingencies may be either generated by other participants or by the system so as to increase the likelihood of a commitment match. For example, an algorithm can be employed which analyzes the commitment space and determine near matches and thereby make suggested modifications which could allow for matched commitments.

A commitment space is a representation of a set of commitments and how they interrelate. A commitment space may include only a single contingent commitment facility or may include more than one contingent commitment facility. A commitment space may be isolated by subject matter, parties, or other categories as may be useful to determine interrelationships and/or obtain potential matches in obligations.

In embodiments, the system may analyze an existing contingent commitment, and modify the form of the existing contingent commitment to increase the likelihood of identifying another commitment which will meet the contingency. For example, a first contingent commitment may provide that a first builder will commit to building on a first property on a street if another property is built on the street. A second contingent commitment may provide that a second builder will commit to building a second property on the same street if another property is built on the street. The system can formulate two new contingent commitments which will facilitate the matching of these contingent commitments to become non-contingent. In this example, the first new contingent commitment can provide that the first builder will commit to building on the first property on the street if another builder makes a commitment to build another property on the same street, contingent upon the first builder's contingent commitment. The second new contingent commitment can provide that the second builder will commit to building on the second property on the street if another builder makes a commitment to build another property on the same street, contingent upon the second builder's contingent commitment. With these new contingent commitments, the system can be better able to match these contingencies to convert them into absolute commitments.

In embodiments, in step S06, the system generates messages and/or reports providing the output data shown in FIG. 2. Messages can include notifications on such topics as: (a) status reports on commitments, (b) whether one or more contingencies have been met, (c) remaining contingencies, (d) proposed modifications, (e) status of participants, (f) additions of new participants, (g) dropping of prior participants, (h) addition of new contingencies, (i) removal of existing contingencies, (j) modifications of existing contingencies, (k) status on related contingent commitment facilities, to name a few. Other similar types of messages may also be sent using the system. In embodiments, messages can be limited to participants and/or observers of contingent commitment facility or may be sent to non-participants in a contingent commitment facility. Appropriate restrictions on the messaging system can be set in accordance with administrative desires, user profile settings or other parameters employed by the system.

Reports may be generated regarding one or more contingent commitment facilities including relevant information. Status reports on one or more contingent commitment facilities may be generated and distributed according to system settings. Such reports can include for one or more contingent facilities a listing of the required commitments, the obligations tied to such commitments, the status of the fulfillment of the commitments, the status of the performance of the obligations, a history of any modification of the commitments, profile information on the participants, a track record of the respective participants, a listing of the observers of one or more contingent commitment facilities, proposals for modified commitments, status of related contingent commitment facilities, commitment space, outstanding contingencies and related commitments, user profile information, and/or other information contained in the system databases. The system may allow customized reports and/or standard reports to be generated.

Figure 4:
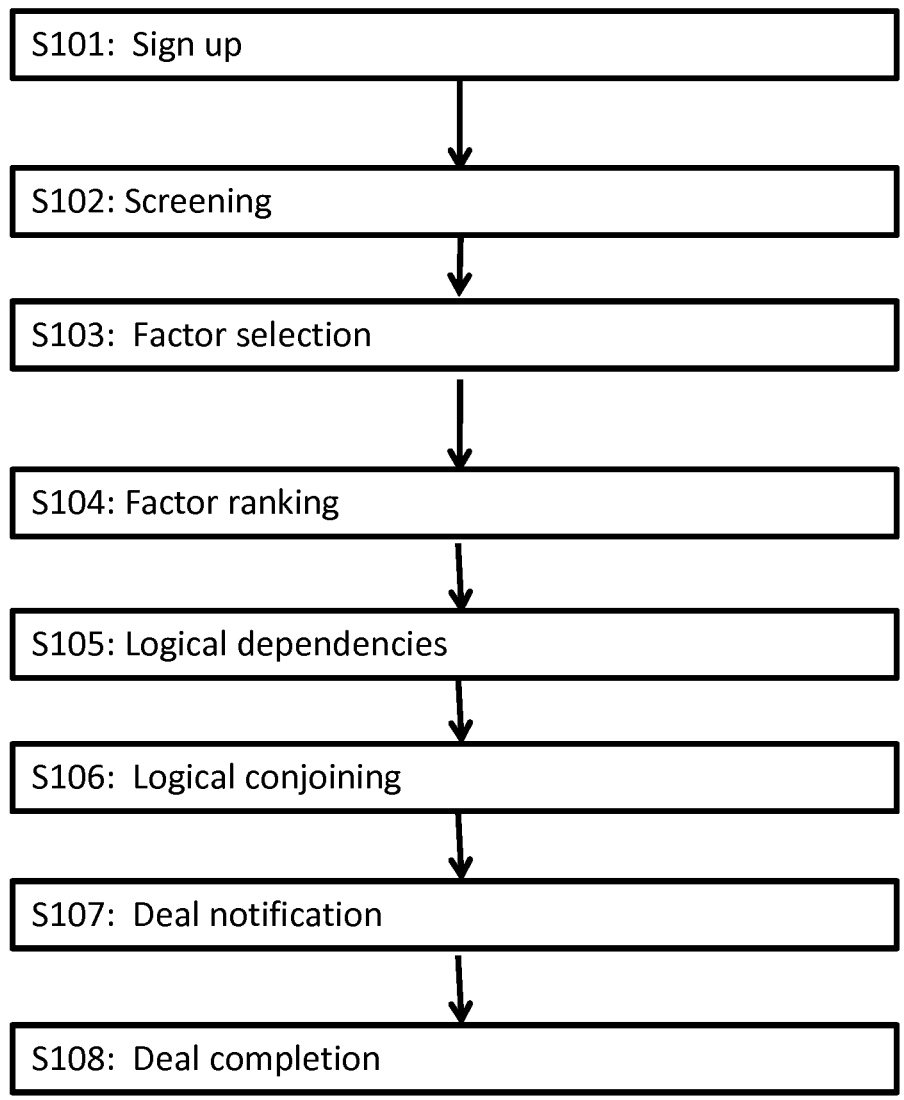
FIG. 4 is an exemplary flow chart illustrating a process in accordance with exemplary embodiments of the disclosure.

FIG. 4 illustrates a process flow for an exemplary embodiment of a contingent commitment module.

In exemplary embodiments, this module provides users with a facility for making contingent commitments of capital and/or other resources, and for transforming such multiple contingent commitments into "done deals." In exemplary embodiments, the module may implement the method described below; however, other tools may also be made available, as well as the capability of a user to use tools of their preference.

One of the greatest impediments to deal making is the need to coordinate decision-making amongst multiple parties. This module allows deal participants to commit their resources on a contingent basis—i.e., subject to other conditions which may include factors including, who else is in on the deal, the management team, the composition of the board of directors, strategic partners, pricing of the deal, terms of later rounds of financing, intellectual property licenses, exit strategy, to name a few.

As shown in FIG. 4, in step S101, one or more agents log into the system and sign up to use the contingent commitment module for one or more problems as part of a problem solving group. A plurality of agents can communicate with the system and the module via appropriate networks and/or other communications portals In exemplary embodiments, the contingent commitment module may be implemented as part of a secure, interactive, online network, e.g., a virtual private network accessible via an internet protocol. In exemplary embodiments, the system can allow for real-time valuation, real-time bilateral negotiation, and real-time contingent commitments-all significantly expediting the deal-making process while lowering costs.

The contingent commitment module may be used to facilitate the managing of contingent commitments. This module can speed up the process by which multiple independent agents may formulate strategy and reach agreements with each other. the module can coordinate decision-making amongst multiple parties. These agreements may be binding, non-binding, or subject to future events. The module can be implemented on a computer system to perform the steps outlined in FIG. 4. This module may also provide users with a facility for making contingent commitments of capital and/or other resources, and/or for transforming such multiple contingent commitments into "done deals." In exemplary embodiment, the module may implement the method described below; however, other tools may also be made available, as well as the capability of a user to use tools of their preference.

In exemplary embodiments, the module can allow deal participants to commit resources on a contingent basis—i.e., subject to other conditions as identified and stored as data in a database which may include one or more of the following: other participants in the deal, management team, board composition, strategic partners, pricing of the deal, terms of later rounds of financing, IP licenses, exit strategy, to name a few.

In step S102, the system screens the agents and a database storing information about agents updated, according to a set of default minimum qualifying criteria established by the contingent commitment module, along with additional criteria that may be supplied by one or more of the agents, or other criteria as may be set. This can be as simple as providing a list of parties who may be eligible to enroll as agents, or may involve efforts to notify potential interested and qualified agents. The list of eligible agents would be stored in the system and accessed by the system to verify an particular agents credentials as the time of engagement.

In step S103, each agent registered by the system and enrolled in a problem-solving group deal may make contingent commitments by selecting (e.g., by clicking boxes on a template or filling in a box, etc.) problem-related factors that are important to said agent. An agent may use a privacy filter to mask any of these factors so that no other agent knows that the factor has been selected by that agent. An agent may also partially mask any of these factors so that only specified other agents may see that it has been selected. Note that an agent may remain anonymous to all other agents, or may choose to reveal various degrees of identifying information to selected agents. The system can implement such privacy setting using filters when providing access of one agents information to another agent.

In step S104, each agent in a problem-solving group may rank in the system the factors in order of importance. These rankings can be converted by the system into default percentage weights with the sum of all rankings equal to 100%. Alternatively, agents may assign some or all of the percentage weights directly to be applied by the system. As in step S103, an agent may set the system to mask or partially mask any of the rankings associated with a factor or other criteria. For purposes of this ranking, no one factor is assumed to be a "deal-killer" for any agent. In embodiments, one factors may also be set as a "deal-killer" so that the system will not match any agent which does not meet the factor.

In step S105, each agent can set in the system logical dependencies between factors (e.g. A and B; B or C; if C then not D; etc.) This is where agents express their "must haves" and their "deal killers". In such cases, the system will not match any agent which does not meet the factor.

In step S106, the logical dependencies specified in step 105 are conjoined by the system to discover the space of all possible solutions to the problem. In embodiments, the conjunction engine of the system looks for all possible solutions involving one or more agents. In embodiments, this engine of the system can produce two types of solutions: (i) absolute solutions, and (ii) contingent solutions. "Absolute solutions" as herein defined are solutions all of whose conditions are satisfied. "Contingent solutions" as herein defined are solutions where one or more of whose conditions are not presently satisfied or are not presently known to be satisfied. Continent solutions may include: solutions that automatically becoming binding; solutions that are non-binding and may be pursued off-line; solutions that are subject to an online vote with pre-defined voting rules which may include plurality, simple majority, super-majority, or unanimous; and solutions that are subject to future contingencies, to name a few.

In step S107, agents are notified of the solutions that have been calculated, with as much information as permitted by the masks adopted by said agents. In embodiments, absolute solutions can be displayed by the system. In embodiments, contingent solutions can be displayed by the system. Contingent solutions may be displayed either with or without their contingencies. An agent can navigate using the system through solutions presented in which the agent is allowed to have access as either a participant or authorized observer.

In embodiments, each solution can have a value associated with it, equal to the sum of all factors included in said solution for each user included in said solution. For example, say that 3 agents are included in a solution: A, B, and C. Say that the sum of included factors for agents A, B, and C are 80%, 50%, and 30%, respectively. The value associated with this solution is 160%.

In step S108, the problem is completed.

In exemplary embodiments, the problem may be completed and a binding commitment arrived at in one or more of the following ways:

Automatic Mode: if all agents agree in advance, the system will assign the absolute solution with the highest associated value into a binding commitment (subject to usual due diligence and closing conditions, and any applicable laws.);

Manual Mode: each agent in the problem solving group may vote using the system for one or more of the absolute solutions in which it is included; the first solution to satisfy the voting rules of the problem solving group is assigned by the system into a binding commitment (subject to usual due diligence and closing conditions, and any applicable laws).

In embodiments, if a problem is not completed, agents may return to steps S101 or S102 to try again. In embodiments, the agent may also update the criteria associated with a problem for reconsideration by the system. In embodiments, agents may also set preferences regarding additional problem-solving rounds, in which they may make conditional commitments to engage in said rounds. These conditional commitments may be based on a standardized set of conditions that may be selected from a template and/or agent-defined conditions that may be submitted to the contingent commitment module.

In embodiments, the systems will reevaluate periodically or continuously the data associated with each agent to determine if a match is presented and a solution is available for presentation to one or more agents.

In embodiments, contingent solutions may be carried over by the system into additional rounds and may become absolute solutions if the conditions that were not satisfied in earlier rounds become satisfied.

In an exemplary embodiment, additional features may be added to the above-described flow. For example, in exemplary embodiments, if no agent objects, an agent may allocate using the system part of his 100% factor allocation to the (negative) value of being left out of the deal. This would lower the value of any solution identified by the system in which that agent was not involved, at the expense of lowering that agents ability to shape the structure of a solution in other ways.

In exemplary embodiments, if no agent objects, an agent may commit up to 100% of his factor weightings in the system to another agent.

In exemplary embodiments, agents may submit information to the system about one or more accounts for payments related to problem-solving group participation and/or transactions arising from solutions. Forms of payment may include: credit card, debit card, stored value card, Paypal, c2it, checking account transfer, or other electronic funds transfer, to name a few. Express authorizations may be received from appropriate authority such as credit card issuer, debit card issuer, bank, or other electronic funds transfer system sponsor, to name a few, to charge the accounts.

In exemplary embodiments, a method for using one or more computers, e.g. CCF server, to solve problems involving a plurality of agents is disclosed. The method may comprise the following steps to be performed using one or more computers, e.g., CCF server. The CCF server may receive a request from a first participant computer system to participate in a new or existing problem-solving group, such as a contingent commitment facility. The first participant computer system may also submit additional information regarding the contingent commitment facility such as an update to be stored in one or more databases operatively connected to the CCF server including such information as potential participants, agents, contingent commitments, and/or rules for processing said commitments to discover potential solutions. The CCF server can then send an electronic update notification to systems associated with agents and/or other participants in the problem-solving group according to agent-definable criteria (as discussed elsewhere). Such notifications can comprise an indication that a new agent has joined the problem-solving group; a description of solutions, if any, discovered by processing of the contingent commitments according to the rules of the database, with an indication of solution type, for each such solution; information about said agent; and/or information about one or more contingent commitments of said agent.

In exemplary embodiments, information about said agent is controlled by privacy filters that can be removed only by said agent.

In exemplary embodiments, information about one or more contingent commitments of said agent is controlled by privacy filters that can be removed only by said agent.

In exemplary embodiments, solutions may be binding, non-binding, subject to vote, and/or subject to future contingencies.

In exemplary embodiments, requests may include at least one contingent commitment relating to the problem.

In exemplary embodiments, one of said solutions may be converted into a binding agreement among the agents or a subset of the agents.

In exemplary embodiments, the method may include additional steps such as receiving an identifier specifying form of payment and account information to be used in providing payments related to problem solving group participation and/or transactions arising from solutions. The form of payment can include credit card, debit card, Paypal, checking account transfer, and/or other electronic funds transfer.

In exemplary embodiments, the method may include additional steps such as receiving an express authorization to charge said account for said problem solving group participation.

In exemplary embodiments, said problem includes at least one of a negotiation among a plurality of parties concerning the price of a collection of goods and/or services; a negotiation among a plurality of parties concerning a scalar value, other than price, relating to a collection of goods and/or services; a negotiation among a plurality of parties relating to venture capital investing; a negotiation among a plurality of parties relating to a joint venture undertaking; a negotiation among a plurality of parties relating to the development of intellectual property; a negotiation among a plurality of parties relating to internal corporate strategic planning; a negotiation among a plurality of parties concerning the scheduling of one or more meetings, events, or processes; a negotiation among a plurality of parties concerning the early adoption of new products and/or services; a negotiation among a plurality of parties concerning terms of settlement of a legal dispute; a negotiation among a plurality of parties concerning disposition of funds for charitable purposes; a negotiation among a plurality of parties concerning conduct of central bank policy; a negotiation among a plurality of parties concerning governmental or inter-governmental policy-making; and/or a negotiation among a plurality of parties relating to group activities.

In exemplary embodiments, a system for processing contingent commitments is provided which comprises various modules. The system may include a module for receiving a request to participate in a new or existing problem-solving group; a module for submitting an update to a database storing information about agents, contingent commitments, and rules for processing said commitments to discover potential solutions; a module for sending an update notification to agents in a problem-solving group according to agent-definable criteria. Example notification can comprise an indication that a new agent has joined the problem-solving group; a description of solutions, if any, discovered by processing of the contingent commitments according to the rules of the database, with an indication of solution type, for each such solution; information about said agent; and information about said agent's contingent commitments.

In exemplary embodiments, a method for using a computer to solve problems involving a plurality of agents is disclosed. A computer system is provided which is operatively connected to a database containing information about agents, contingent commitments and/or rules for processing the respective commitments to discover potential solutions. The method comprises the computer receiving a request sent by a user system to participate in a new or existing problem-solving group. In exemplary embodiments, the request can include at least one contingent commitment relating to a solution. In exemplary embodiments, the request can include more than one commitment relating to the solution, wherein at least one of the commitments is subject to at least one contingency. The system database is then updated to store information about agents, contingent commitments, and rules for processing said commitments to discover potential solutions. The system can then send an update notification to agents in the problem-solving group via their respective devices according to agent-definable criteria. Such notification can comprise an indication that a new agent has joined the problem-solving group; a description of solutions, if any, discovered by processing of the contingent commitments according to the rules of the database, with an indication of solution type, for each such solution; information about said agent; and information about one or more contingent commitments of said agent, to name a few.

In exemplary embodiments, the system may use privacy filters. In exemplary embodiments, such filters can be removed only by said agent. Privacy filters may be used to control such information as information about the agent, information about one or more contingent commitments associated with one or more respective agents, to name a few.

In exemplary embodiments, the contingent facility may be set up so that solutions can be binding, non-binding, subject to vote, and/or subject to future contingencies, to name a few.

In exemplary embodiments, the method may further include the system converting a contingent commitment to a binding commitment among agents or a subset of agents when prerequisite contingencies have been identified as being satisfied.

In exemplary embodiments, the method may further include the system receiving an identifier specifying form of payment and account information to be used in providing payments related to problem solving group participation and/or transactions arising from solutions. Exemplary forms of payment can include credit card, debit card, Paypal, checking account transfer, prepaid cards, stored value cards, gift cards and/or other electronic funds transfer, to name a few.

In exemplary embodiments, the method may further include the system may receive an express authorization to charge said account for said problem solving group participation. The express authorization may be received from a credit card issuer, a debit card issuer, a bank, an electronic transaction processor and/or other electronic funds transfer system sponsor, to name a few.

In exemplary embodiments, the problem to be solved can include, by way of example, a negotiation among a plurality of parties concerning the price of a collection of goods and/or services; a negotiation among a plurality of parties concerning a scalar value, other than price, relating to a collection of goods and/or services; a negotiation among a plurality of parties relating to venture capital investing; a negotiation among a plurality of parties relating to a joint venture undertaking; a negotiation among a plurality of parties relating to the development of intellectual property; a negotiation among a plurality of parties relating to internal corporate strategic planning; a negotiation among a plurality of parties concerning the scheduling of one or more meetings, events, or processes; a negotiation among a plurality of parties concerning the early adoption of new products and/or services; a negotiation among a plurality of parties concerning terms of settlement of a legal dispute; a negotiation among a plurality of parties concerning disposition of funds for charitable purposes; a negotiation among a plurality of parties concerning conduct of central bank policy; a negotiation among a plurality of parties concerning governmental or inter-governmental policy-making; and/or a negotiation among a plurality of parties relating to group activities, to name a few.

In exemplary embodiments, a system for processing contingent commitments is disclosed. The system can include various programmed modules stored on computer readable memory that is operatively connected to one or more processors for executing the modules. Such modules may include: a module for receiving a request to participate in a new or existing problem-solving group; a module for submitting an update to a database storing information about agents, contingent commitments, and rules for processing said commitments to discover potential solutions; a module for sending an electronic update notification to agents in a problem-solving group according to agent-definable criteria. The electronic update notification may comprises such information as an indication that a new agent has joined the problem-solving group; a description of solutions, if any, discovered by processing of the contingent commitments according to the rules of the database, with an indication of solution type, for each such solution; information about said agent; and information about said agent's contingent commitments, to name a few.

EXAMPLE CONTINGENT COMMITMENT FACILITIES

The following examples are meant to illustrate the scope of the disclosure and are in no way intended to be limiting.

Example 1

Job Creation Commitment Contingent Facility

In an example, a job creation commitment contingent facility may be implemented using the system and methods of the present invention.

In accordance with the process set forth in FIG. 3, the goal is established for the contingent commitment facility of creating a defined number of jobs in a particular region. For example, to create 1000 jobs in New York City. The parameters can include description of the types of jobs, e.g., must pay at least $20.00 per hour, must employ U.S. citizens, must be related to particular industry, e.g., film industry, etc. Other parameters can include such variables as the location of the jobs, the length of employment commitment, restrictions on the participants—e.g., must be a major film studio—, etc.

Once the parameters are set in accordance with step S01, the system will generate a pool of potential participants in accordance with the parameters. Participants in this example may include each of the major film studios. The list may be generated by the system comparing the parameters with accessible databases, and/or be set by the user entering the parameters. When the system identifies automatically potential participants, as in this example, the system may generate a list of major film studios who have made films in the past in New York City and employ individuals at rates consistent with the parameters set.

In embodiments, if the system fails to identify any or a sufficient number of potential participants it may generate a list of potential modifications of the parameters to increase the pool of potential participants. For example, if one of the parameters requires that the jobs created are paid at $20 per hour, but 5 major studios only pay $18 per hour, the system may suggest modifying the parameters to have the jobs paid at least $18 per hour to increase the pool of potential participants.

Once potential participants are identified, the system will send messages to contact such potential participants to invite them to join the contingent commitment facility. Thus, for example, in this case, the system can send an invitation to each of the major studios identified as meeting the criteria for participants.

The potential participants then may respond by accepting the invitation, rejecting the invitation, and/or inquiring for more information. If the invitation is accepted, the participants may engage into either a blanket commitment, a binding contingent commitment, or a nonbinding commitment. For example, a studio which is going to film a movie in New York, may simply respond by agreeing that it is filming the particular movie in New York and will be employing 100 workers meeting the criteria of the facility. Another studio may respond by saying it is looking for a location for a new film, and if it receives funding of $20 million it will commit to film in New York to employ 150 workers meeting the criteria. Thus, a contingent commitment will be added to the facility. Other contingencies could include, by way of example, a commitment for police services, a waiver of permitting requirements, a commitment of 150 qualified workers to be available at a particular date and time, and/or any other criteria that may be required for the studio to go forward with the project as planned.

Yet another studio may respond by indicating that it plans to make three movies in the next three years, and would be willing to make a non-binding commitment to make at least two of the movies in New York City, subject to certain events happening. By allowing nonbinding commitments to participate in the facility, the organizer may be able to identify potential participants who may later be able to make firm binding commitments (contingent or otherwise) and/or to gauge the type of contingencies that may be necessary to achieve the desired goal.

As the participant identify new contingencies, the potential universe of participants to be identified by the system or the users is likely to grow. Thus, when one of the film studios identifies the need for a sufficient number of camera men to be available in June and July to make the film, appropriate camera men and/or organizations obtaining camera men may be invited to join as potential participants in the facility. In this manner, the number and type of participants may grow and diversify as the more and more contingencies are involved.

As contingencies are met, the system can generate notifications to participants. Notifications can include, by way of example, notifying the major studio that an appropriate camera men have been identified and committed to participate at the desired time and location.

The system may also allow observers to see the status of the facility and provide comments. For example, one observer may be able to identify to the system potential participants to invite to participate to fulfill an as of yet unfulfilled commitment. E.g., invite Company A to join the facility to provide camera men.

Other examples of potential conditions may include the system receiving similar contingent commitments from a critical mass of companies (e.g., if 5 other films will be made in New York City, the major studio will make 2 more films); Federal, State, or other government incentives for reaching hiring targets (e.g., New York City granting the first major studio to commit to making 5 films in a given year free access to its municipal buildings for 5 weekends); and specific economic indicators and/or financial indexes staying within or reaching specific levels (e.g., if the DJIA index stays over 11,000, a financial company will commit to provide at least $5 million in film financing for a picture made in New York City).

In exemplary embodiments, "critical mass" may be defined by a simple number of companies (e.g., 5 major studios); a number relating to the size of participant companies, where size may refer to total annual sales, current number of employees, market (or free float) capitalization (for public companies), or other economic or financial factors, summed over all participants (e.g., at least 5 major studios with over $100 million in film projects in a given year); and/or restricted to a specific set of industries and/or geographic areas, including areas defined by political/administrative jurisdictions (e.g., only New York based film studios).

Example 2

Another Job Creation Example

In another exemplary embodiment, consider a neighborhood within an American city of approximately 100,000 people. The neighborhood contains approximately 10% of the homes and businesses of the city. Of the approximately 10,000 residents, 3,000 have jobs and half of those jobs are in the local neighborhood. Another 1,500 people from outside the neighborhood commute in, bringing the total number of jobs in the neighborhood to 3,000.

At one intersection, there is a coffee shop, a small supermarket, a furniture store, and a small factory. All told, these four businesses employ 150 people, 5% of the total number of people employed in the neighborhood. 75, or half of that total, are also residents; the other half reside elsewhere.

These four businesses are a small part of an economic web that extends throughout the neighborhood, and an even smaller part of the larger webs that extend throughout the city, state, region, nation, and globe. As such, they are a microcosm of how one or more suitably configured CCFs may bring about many new jobs, through benign cooperation between members of these economic webs that lets them overcome their fear and get growth going again.

50 of the 150 workers at this particular crossroads work at the supermarket, another 75 work at the factory, 15 at the furniture store, and the remaining 10 at the coffee shop. A CCF for this "model ecosystem" may be implemented as follows: the CCF server receives data from each of the four businesses about its respective current sales and number of employees; it transmits an initial list of contingent commitments for each business to consider, request that each business add the greater of (1 extra worker, 5% of existing workforce). This translates into 1 extra worker at the coffee shop, another extra worker at the furniture store, 2.5 extra workers at the supermarket, and let's say 4 (rounding up) extra workers at the factory. These additional hires would be conditional on all four of the participants making their respective commitments, and the existing and newly hired workers making the following additional commitments: workers at the 3 non-coffee shop businesses and/or other members of the community contingently agree to patronize the coffee shop in sufficient number to at least justify the cost of hiring the additional employee. Assuming that the additional employee costs the coffee shop $500 per week, this would be satisfied if 100 individuals committed to spending $10 per week and half of that $1,000 in incremental revenue being available to pay for the additional worker.

Similarly, workers and others contingently agree to spend more at the furniture store and the supermarket, and local businesses agree to spend more at the factory. When a sufficient number of contingent commitments have been received, critical mass is achieved and the commitments may become binding.

Alternatively, the commitments may remain non-binding until other neighborhoods reach their critical mass. In a preferred alternative embodiment, the commitments are made contingent on the operation of one or more additional CCFs, whose commitments are in turn made contingent on the first CCF. In other words, a multiple-level CCF, is established in which the satisfaction of contingent commitments at the local level is a step towards the creation of binding commitments at a higher level, such as the city, state, region, or nation as a whole.

The conditions under which contingent commitments become binding commitments may be determined in advance as a precondition for entry into the CCF, or said conditions may be decided by one or more operations of the CCF. For example, the local CCF may be set up with the condition that at least 3 other localities must have reached first-level Binding commitments and have a second-level agreement that all 4 localities will convert their first-level binding commitments into actual binding commitments once all four have first-level binding commitments. In a multi-level CCF, only the top level binding commitments are actually binding. Binding commitments may be divided to arrive at within a multi-level CCF into contingently binding commitments and absolutely binding commitments.

A small team of financial technologists may deploy a functioning single-level CCF in a matter of weeks. More complex implementations of multiple CCFs, linked together in series, in parallel, hierarchically, or in a combination of the aforesaid and/or other topological configurations, may take substantially longer to deploy.

A CCF may operate at the level of a local community, gathering and processing the Contingent commitments of members of that community. It may also operate at higher levels of the political/economic system, such as city (or county), state, regional, national, or international levels. One or more CCFs may operate on one or more levels simultaneously and/or sequentially.

Clear, measurable results would be visible in the real-time data received by said one or more CCFs. Use of a computer system and/or other information technology for transmitting, receiving, storing and/or processing Contingent commitments may facilitate reaching critical mass quickly, while protecting the privacy and confidentiality of workers, companies, and other parties involved.

One might worry that the CCF might work too well, allowing our economy to overheat and igniting a ruinous inflation. But this worry is misplaced, as Contingent commitments can be used to slow an overheated economy as well as to speed up an economy frozen by fear. In fact, had a CCF been available in the run-up to the financial crisis, incentives to take too much risk could have been defeated with actionable incentives to control risk properly.

This idea has the potential to go viral, with social media, websites, blogs, apps, and traditional print and broadcast media joining to transform the tide of fear into a tide of hope.

Social media may preferably play a special role, as one or more CCFs may be linked to or embedded in social media systems; conversely, one or more social media systems may preferably be embedded in one or more CCFs.

Example 3

Organizing Boycott or Protest Contingent Facility

In another exemplary embodiment, one or more individual(s) and or group(s) wish to organize a boycott of one or more organizations or protest. To be effective, a boycott or protest may preferably include diverse individuals and/or groups with different characteristics. For example, three hundred major website providers want to set up a protest regarding a proposed new legislation. The providers are each willing to take their websites down for a day as a symbol of protest, as long as the right group of other providers commit to taking down their website simultaneously.

However, the potential protesting groups do not trust each other and each wants to make sure that the other relevant groups are pulling their respective weight. A multi-level CCF may be set up to identify the particular contingencies that each potential participant will require to take down their website on a particular day.

For example, one potential participant may run a book selling website, and may require its major competitor to participate. Another potential participant may run an auction website and require that at least 100 of its members "like" its web page on a relevant social network to show they agree with the proposal to protest. Another website which provides information about anything, may require that at least 5000 people donate money to particular charity before a given date to participate.

The system can then keep track of the respective commitments, monitor the progress, and provide reports on contingencies status.

Example 4

Contingent Crowd Switching Facility

In another exemplary facility, a goal of establishing a new service provider in a local community may be set. Under this goal, a local town may desire to obtain a new grocery store to provide specialties foods. A facility can be set up to establish the community goal and identify potential participants who may open the proposed grocery store. Invitations to major chains, small family run grocery stores or other potential owners based on other criteria may be sent by the system.

Potential participants may set up a contingent commitment to open the grocery store which could include contingencies like obtaining appropriate government approvals (e.g., permits, zoning waivers, parking spots), obtaining appropriate tax abatements (e.g., 10 year property tax reduction), identifying an appropriate site (e.g., a location with 100,000 square feet of space on the floor space, on a major street, with over 50 parking spaces), obtaining a commitment of a sufficient number of committed shoppers (e.g., a commitment of 100 community members to spend at least $50 a week for a year at the new store), etc.

These contingencies then can be used to identify additional participants in the facility to fulfill the contingencies. For example, the contingency of requiring a commitment of 100 community members to spend at least $50 a week for a year in the new store, may result in a invitation to all the local residents within a 2 mile radius to join the facility. The invited residents then could have their own contingencies, like, a willingness to spend at least $50 a week if the store sells milk for less than $2 a gallon, or the store sells particular kinds of foods, e.g., kosher foods, certain brand ice cream, gluten free cereals, etc. These contingencies can in turn result in additional participants being invited to participate like gluten free cereal manufacturers and/or distributors to agree to provide a sufficient quantity of such items to the new store.

The system can then keep track of the respective commitments, monitor the progress, and provide reports on contingencies status.

The present invention is not intended to be limited to these examples, which are merely intended to be illustrative and not limiting.

Now that exemplary embodiments of the present disclosure have been shown and described in detail, various modifications and improvements thereon will become readily apparent to those skilled in the art.

It will be understood that one or more of the steps described can be rearranged, separated, and/or combined without deviating from the scope of embodiments of the disclosure. For ease, steps are, at times, presented sequentially. This is merely for ease and is in no way meant to be a limitation.

Further, it will be understood that one or more of the elements and/or exemplary embodiments of the disclosure described can be rearranged, separated, and/or combined without deviated from the scope of the disclosure. For ease, various elements are described, at times, separately. This is merely for ease and is in no way meant to be a limitation.

While the various steps, elements, and/or exemplary embodiments of the disclosure have been outlined above, it is evident that many alternatives, modifications and variations will be apparent to those skilled in the art. The various steps, elements, and/or exemplary embodiments of the disclosure, as set forth above, are intended to be illustrative, not limiting. Various changes can be made without departing from the spirit and scope of the disclosure. Accordingly, the spirit and scope of the present disclosure is to be construed broadly and not limited by the foregoing specification.

No element, act, or instruction used in the description of the present application should be construed as critical or essential to the disclosure unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. In addition, as used herein, the term "set" is intended to include any number of items, including zero. Further, as used herein, the term "number" is intended to include any number, including zero.

What is claimed is:

1. A computer implemented method comprising:
    (a) accessing, using one or more computers, one or more electronic databases, stored on one or more computers-readable media in the performance of one or more of the following steps, the one or more databases comprising:
        (i) participant information comprising identifying information of respective participants and contact information of respective participants;
        (ii) contingent commitment facility information comprising problem information, identification of participants for the facility information, and one or more rules for processing commitments associated with said facility;
        (iii) contingent commitment information comprising contingency information indicating one or more commitments contingent on the occurrence of one or more events;
        (iv) condition information comprising status information on events associated with respective contingent commitments;
    (b) receiving, by the one or more computers from a first user device, contingent commitment facility information associated with establishing a contingent commitment facility comprising CCF criteria for participation in the contingent commitment facility;
    (c) storing in the one or more databases the contingent commitment facility information;
    (d) determining, by the one or more computers, one or more potential participants in the contingent commitment facility who meet CCF criteria associated with the contingent commitment facility;
    (e) sending, by the one or more computers to devices associated with the one or more potential participants, invitations to participate in the contingent commitment facility;
    (f) receiving, at the one or more computers from at least one device associated with at least one of the one or more potential participants, first contingent commitment information associated with the at least one first potential participant and the contingent commitment facility, the first contingent commitment information comprising a first commitment and a first contingency;
    (g) storing in the one or more databases the first contingent commitment information;
    (h) determining, using the one or more computer systems, a first status of contingencies in the contingent commitment facility;
    (i) sending, using the one or more computers systems to at least the first user device, the first status;
    (j) receiving, at the one or more computers, from at least one device associated with at least one of the one or more potential participants, second contingent commitment information associated with the at least one second potential participant, the second contingent commitment information comprising a second commitment matching the first contingency and a second contingency;

(k) storing in the one or more databases the second contingent commitment information;

(l) receiving, at the one or more computers, from at least one device associated with at least one of the one or more potential participants, third contingent commitment information associated with the at least one third potential participant, the third contingent commitment information comprising a third commitment matching the second contingency and a third contingency matching either the first or second commitment; and (m) storing in the one or more databases the third contingent commitment information.

2. The method of claim 1, wherein the database further comprises filter information associated with a respective participant, and information regarding the respective participant is made available to other participants in accordance with said filter information.

3. The method of claim 1, wherein the database further comprises filter information associated with a respective contingent commitment information, and information regarding the respective contingent commitment information is made available to participants in accordance with said filter information.

4. The method of claim 1, wherein the database further comprises filter information associated with a respective contingent commitment facility information, and information regarding the respective contingent commitment facility information is made available to participants in accordance with said filter information.

5. The method of claim 1 further comprising the steps of:
(n) receiving, by the one or more computers, first condition information regarding at least one contingent commitment;
(o) storing in the one or more databases the first condition information;
(p) determining, using the one or more computer systems, a second status of contingencies in the contingent commitment facility based on at least in part the first condition information; and
(q) sending, using the one or more computers systems to at least the first user device, the second status.

6. The method of claim 5, wherein the first status indicates the first commitment is a contingent commitment and the second status indicates the first commitment is a conditionally binding commitment.

7. The method of claim 5, wherein the first status indicates the first commitment is a contingent commitment and the second status indicates the first commitment is an absolutely binding commitment.

8. The method of claim 5, wherein the first status indicates the first commitment is a conditionally binding commitment and the second status indicates the first commitment is an absolutely binding commitment.

9. A system comprising:
(a) one or more electronic databases, stored on one or more computers-readable media in the performance of one or more of the following steps, the one or more databases comprising:
(i) participant information comprising identifying information of respective participants and contact information of respective participants;
(ii) contingent commitment facility information comprising problem information, identification of participants for the facility information, and one or more rules for processing commitments associated with said facility;
(iii) contingent commitment information comprising contingency information indicating one or more commitments contingent on the occurrence of one or more events;
(iv) condition information comprising status information on events associated with respective contingent commitments;
(b) one or more computers operatively connected to the one or more electronic databases, comprising one or more processors, memory, and non-volatile computer-readable storage media including computer-readable code that is read by the one or more processors to perform a method comprising:
(1) receiving, from a first user device, contingent commitment facility information associated with establishing a contingent commitment facility comprising CCF criteria for participation in the contingent commitment facility;
(2) storing in the one or more databases the contingent commitment facility information;
(3) determining, by the one or more computers, one or more potential participants in the contingent commitment facility who meet CCF criteria associated with the contingent commitment facility;
(4) sending, by the one or more computers to devices associated with the one or more potential participants, invitations to participate in the contingent commitment facility;
(5) receiving, at the one or more computers from at least one device associated with at least one of the one or more potential participants, first contingent commitment information associated with the at least one first potential participant and the contingent commitment facility, the first contingent commitment information comprising a first commitment and a first contingency;
(6) storing in the one or more databases the first contingent commitment information;
(7) determining, using the one or more computer systems, a first status of contingencies in the contingent commitment facility;
(8) sending, using the one or more computers systems to at least the first user device, the first status;
(9) receiving, at the one or more computers, from at least one device associated with at least one of the one or more potential participants, second contingent commitment information associated with the at least one second potential participant, the second contingent commitment information comprising a second commitment matching the first contingency and a second contingency;
(10) storing in the one or more databases the second contingent commitment information;
(11) receiving, at the one or more computers, from at least one device associated with at least one of the one or more potential participants, third contingent commitment information associated with the at least one third potential participant, the third contingent commitment information comprising a third commitment matching the second contingency and a third contingency matching either the first or second commitment; and
(12) storing in the one or more databases the third contingent commitment information.

10. The system of claim 9, wherein the database further comprises filter information associated with a respective participant, and information regarding the respective participant is made available to other participants in accordance with said filter information.

11. The system of claim 9, wherein the database further comprises filter information associated with a respective contingent commitment information, and information regarding the respective contingent commitment information is made available to participants in accordance with said filter information.

12. The system of claim 9, wherein the database further comprises filter information associated with a respective contingent commitment facility information, and information regarding the respective contingent commitment facility information is made available to participants in accordance with said filter information.

13. The system of claim 9, wherein the method further comprises the steps of:
 (13) receiving, by the one or more computers, first condition information regarding at least one contingent commitment;
 (14) storing in the one or more databases the first condition information;
 (15) determining, using the one or more computer systems, a second status of contingencies in the contingent commitment facility based on at least in part the first condition information; and
 (16) sending, using the one or more computers systems to at least the first user device, the second status.

14. The system of claim 13, wherein the first status indicates the first commitment is a contingent commitment and the second status indicates the first commitment is a conditionally binding commitment.

15. The system of claim 13, wherein the first status indicates the first commitment is a contingent commitment and the second status indicates the first commitment is an absolutely binding commitment.

16. The system of claim 13, wherein the first status indicates the first commitment is a conditionally binding commitment and the second status indicates the first contingent commitment is an absolutely binding commitment.

* * * * *